United States Patent Office 3,309,111
Patented Mar. 14, 1967

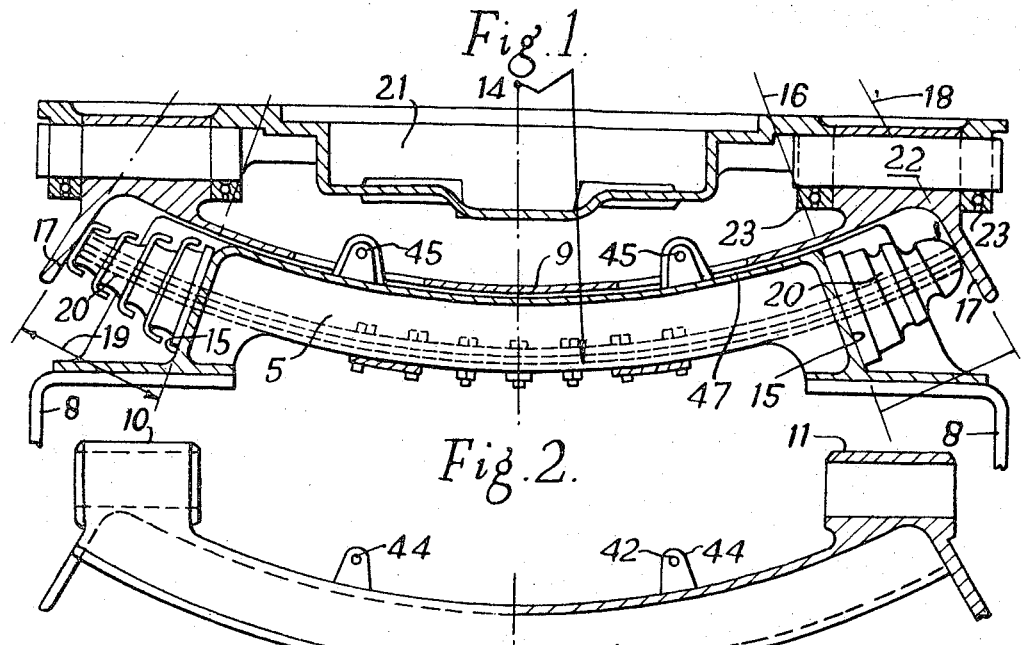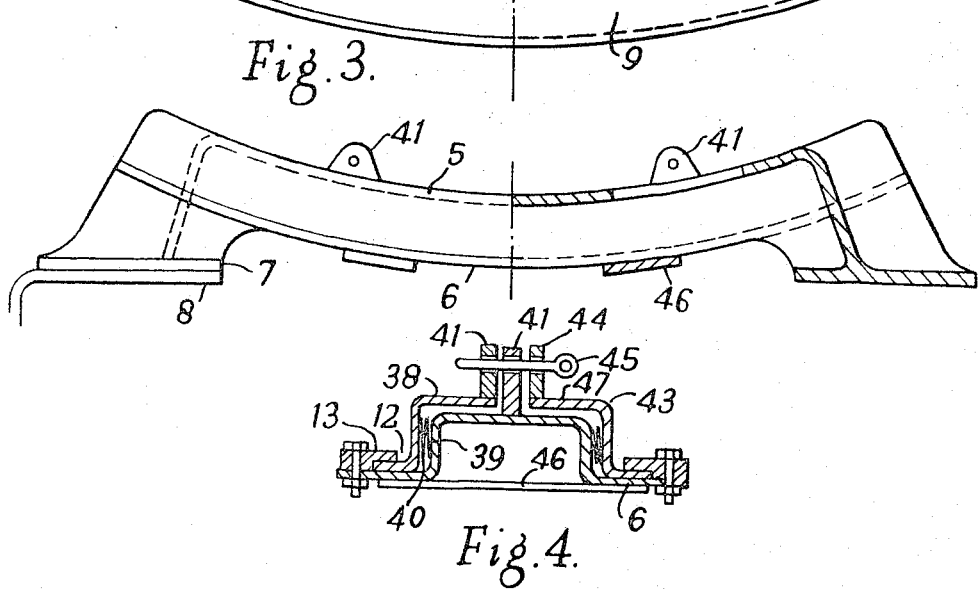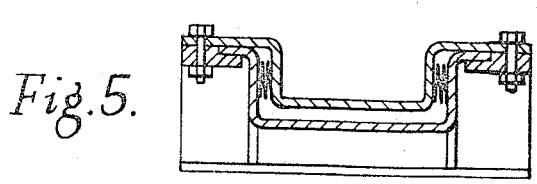

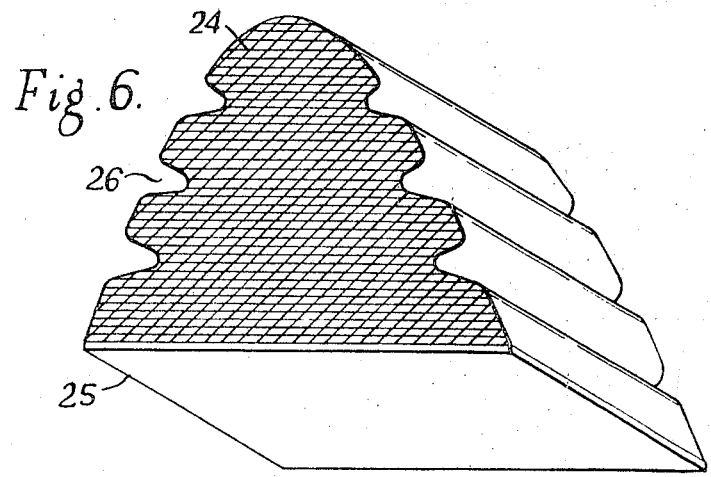
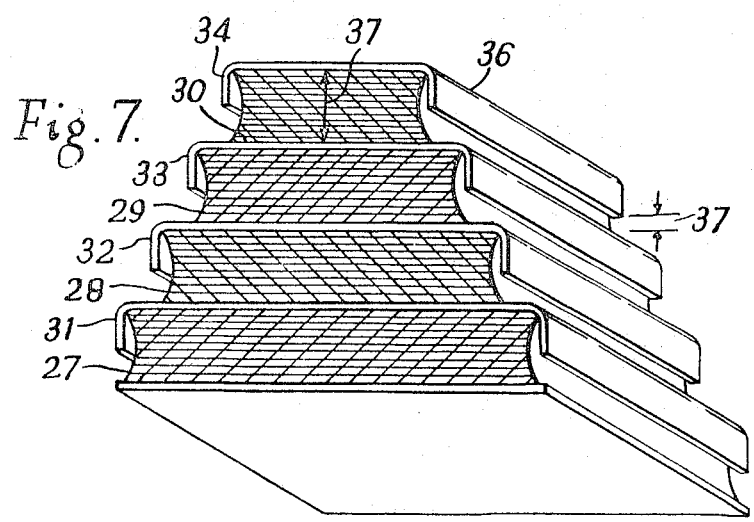

3,309,111
SEMI-TRAILER COUPLING
Alexandre Vaugoyeau, Saint Marcel,
Marseille, France
Filed Nov. 16, 1964, Ser. No. 411,362
Claims priority, application France, Sept. 3, 1964,
20,679
2 Claims. (Cl. 280—438)

Semi-trailer coupling devices comprising a transversal oscillation system, such as those described in U.S. Patent No. 2,833,561 of Feb. 27, 1956, have shown that if these new means resulted in an improved system of connection between a tractor and a semi-trailer the results obtained were still not fully satisfactory.

The fact is that the area of the wearing surfaces was not always sufficient to reduce the wear to acceptable limits, in addition to which, if the coupling was required to be capable of undergoing transversal inclination, it was essential to brake this inclination in proportion to that of the coupling. It was also necessary to apply a progressive correcting force to the coupling in order to cause it to return to the horizontal position as soon as the force which had produced the inclination had disappeared.

An object of the invention is to provide resilient buffer blocks to resist angular movements between a tractor and trailer in a semi-trailer coupling system wherein under increasing compression successively greater cross sections of buffer come into action.

The purpose of the invention is to provide a damping device with a constant and progressive action, always remaining in contact and acting between the stops, the course taken by the surfaces of these latter being in accordance with radii passing through the centre of oscillation of the coupling, in addition to which the positioning of the surfaces in contact enables wearing surfaces to be obtained, in order to reduce the amount of wear undergone.

It is characterised by the means used, considered both in conjunction with one another and independently of one another, and more particularly by a platform mechanism supported by a rigid seat made in one single piece with two aligned bearings which fit onto a curved cradle affixed to the tractor in the manner of a cross-piece which supports the entire system via external wings curved in accordance with the generatrix of a cylinder of which the longitudinal axis is situated in the vicinity of the centre of gravity of the semi-trailer, in such a way as to enable the coupling to oscillate to the right and to the left by a sliding movement, resting on constantly and progressively acting elastic devices, the thrust thereby produced being the more powerful, the greater the angle of inclination; the progressive stops, in permanent contact, are formed by rubber buffers with a progressive surface.

On the accompanying drawings which illustrate by way of an example and without any limitative effect one possible constructional version of the object of the invention:

FIG. 1 shows the entire coupling system in longitudinal section;

FIGS. 2 and 3 show the seat and cradle, with their constructional characteristics;

FIG. 4 shows how the respective components are keyed together, to provide a fixed coupling;

FIG. 5 illustrates an alternative constructional version;

FIGS. 6 and 7 show the rubber buffers;

Figure 8:
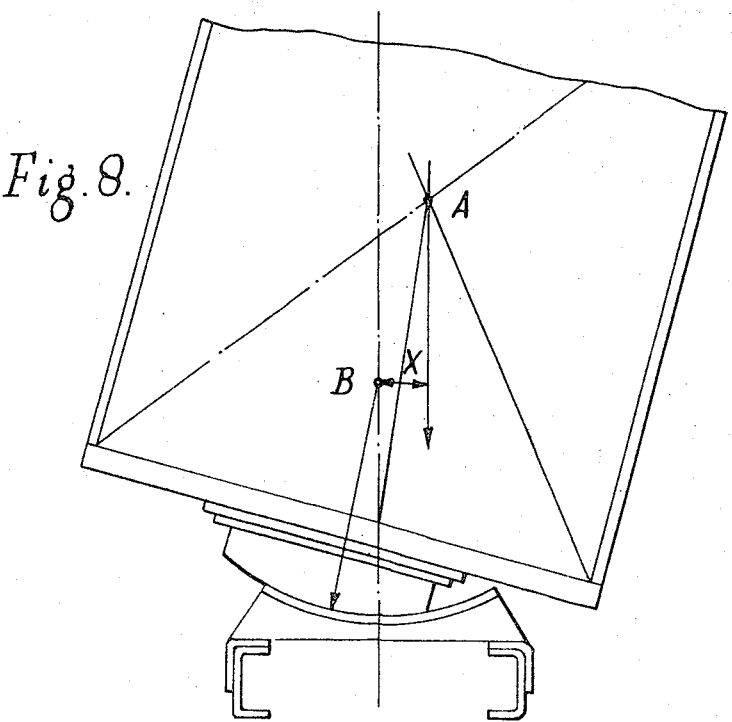
FIGS. 8, 9 are provided for purposes of comparison, in order to show the technical improvements carried out.

The coupling device shown in FIGS. 1 to 5 consists of a curved cradle 5 of omega-shaped section with wings 6 curved in accordance with the generatrix of a cylinder of which the axis is situated above the platform of the coupling system and of which the radius of curvature is sufficiently great to ensure that its centre is in the immediate vicinity of the longitudinal axis through which passes the centre of gravity of the semi-trailer in use.

The lower part of the cradle is provided with supporting feet 7 which enable it to be firmly affixed to the chassis 8 of the tractor, of which it constitutes a supplementary cross-piece. This cradle 5 is covered by a seat 9 comprising two bearings 10 and 11, likewise of omega-shaped section, so that it will fit accurately onto the cradle 5.

The seat 9 rests against the cradle 5 via wings 12 which are curved like the wings 6 and pressed against the wings 6 of the cradle 5 by means of curved keys 13 and secured in such a manner that the seat 9 is free to slide on the cradle 5.

The seat 9 slides on the cradle 5 without becoming disconnected from it, rotating about the centre of curvature 14 of the wings 6 of the cradle 5 and the wings 12 of the seat 9. The ends of the cradle 5 are provided with surfaces 15 which take a course in accordance with a radius 16 of which the centre B is the same as the centre of curvature 14 of the wings 6 and the wings 12. The seat 9 is likewise provided with surfaces 17 taking a course in accordance with a radius 18 having the same centre as the radius 16.

The surfaces 15 and 17 are positioned in such a way that when the seat 9 is placed on the cradle 5 a sufficient space 19 is left between these surfaces to accommodate a resilient device 20 in contact at all times with the surfaces 15 and 17.

The bearings 10 and 11 support the coupling device proper 21, via transversal shafts 22 secured in bosses 23 forming part of the coupling device 21.

The coupling system thus constructed and assembled inclines backwards from the front by rotating about the shafts 22 and can incline to the right or to the left by sliding on the wings 6 of the cradle 5, the entire system rotating about the common centre 14.

When the coupling device inclines either to the right or to the left, the surfaces 15 and 17 move closer to or farther away from each other, producing a greater or smaller degree of compression in the device 20, of which the subsequent expansion enables the position of the coupling device to be corrected.

As both surfaces 15 and 17 take a course in accordance with radii having the same centre 14 as the curved surfaces of the cradle 5 and of the seat 9, the compression of the resilient devices 20 always takes place normally and without any slip.

The resilient devices 20 are always in contact with the surfaces 14 and 17, their action thus being constant, and in order to ensure that it is at all times in proportion to the angle of inclination of the coupling system it is intended that they shall be constructed in such a manner that the thrust exerted by them is progressive and in proportion to their compression.

The resilient device shown in FIG. 6 consists of a block of rubber 24, of parabolic section, affixed by an adhesive to a metal mounting plate 25. The progressive action of this device is ensured in the first place by the parabolic section of the block but is also due to grooves 26 of a greater or a smaller depth and taking a mutually parallel course along the surface of the block.

According to FIG. 7 the device consists of a series of rubber blocks 27, 28, 29 and 30 of decreasing area and fixed between metal plates 31, 32, 33, 34 and 35. These plates 31 to 34 are provided with turned edges 36 of which the height is less than the thickness 37 of the rubber blocks 27, 28, 29 and 30 between the two consecutive plates.

The extent of these gaps corresponds to the distance by which it is possible to compress the rubber without damaging it.

The operation of this device is very simple.

The force required to compress the rubber buffer is in proportion to its area and it is easy to see, when the device is in position on the coupling, that if, owing to its angle of inclination, surfaces 15 and 17 come together then the buffer 30 which is the one having the smallest area will be compressed first, only opposing a moderate force to this compression until its metal part 34 comes in contact with the subsequent metal part 33. If the angle of inclination increases the next buffer undergoing compression will be 29 followed by the buffer 28 and then by the buffer 27. The re-straightening process will be accompanied by the converse effects. This results in a progressive and constant action which has not been obtained with the devices used hitherto.

Furthermore, since the bearing surface of the seat 9 on the cradle 5 is positioned on the largest radius the resulting pressure will be very slight and the frictional wear extremely limited.

Again, since the two bearings 10 and 11 are integral with the seat 9, they provide the coupling system with a firm foundation in addition to ensuring accurate alignment of the transversal shafts 22.

As the hitch attachment formed by the parts 13 embraces the entire curved portion of the system, the connection between the cradle 5 and the seat 9 is rendered externally firm.

It is also intended that easily replaceable wear plates 40 shall be interposed between the vertical surfaces 38 and 39 of the seat 9 and of the cradle 5. Struts 46 are provided to increase the firmness of the cradle 5, which is also fitted with lugs 41 provided with holes 42. The two lugs 41 pass through the upper surface 43 of the seat 9 which is also equipped with lugs 44 having orifices of the same diameter, so that the seat 9 can be prevented from sliding on the cradle 5 in the event of very heavy loads. In this case it is sufficient for suitable pins 45 to be introduced through the lugs 44 and 41 to convert the oscillating coupling into a fixed coupling.

The firmness of the seat 9, the ample size of the bearing surfaces of the seat and of the cradle and the progressive action of the resilient position-correcting device for the coupling constitute a distinct measure of technical progress.

It is possible to reverse the omega-shaped constructions of the cradle and the seat, according to FIG. 5, but in this case the wings 5 and the wings 12 would be situated at the top.

Furthermore, a slight space 47 is left between the horizontal surfaces of the cradle 5 and of the seat 9, to enable the seat 9 to be partly supported by the initial tension of the damping buffers 20, a clearance of the same magnitude being provided between the retaining surfaces of the curved keys 13 and those of the wings 12, and this enables the coupling system to undergo a slight inclination even if the semi-trailer is empty.

The device forming the subject of this application enables the drawbacks hitherto encountered to be avoided.

Figure 9:
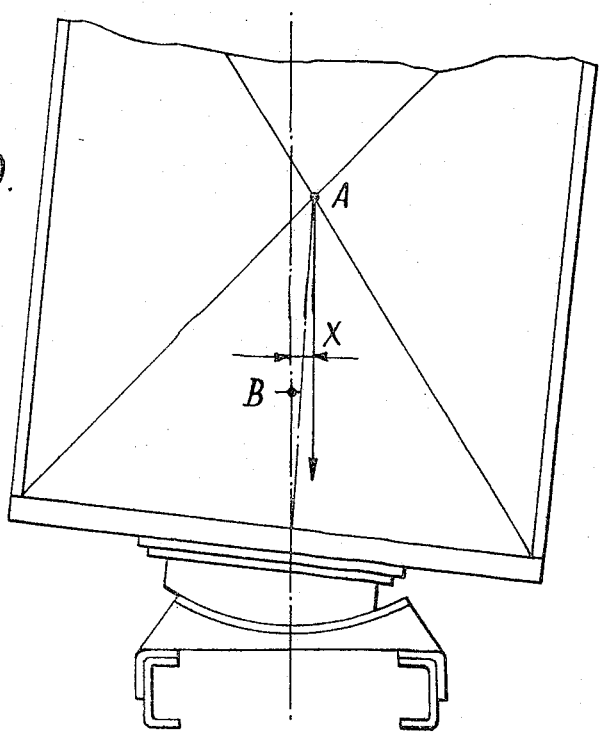

The fact is that when a semi-trailer is inclined at a considerable angle, as in FIG. 8, or at a smaller angle, as in FIG. 9, the centre of gravity is at A, which is in reality very close to the centre of oscillation B of the coupling system.

A different correcting torque will then have to be exerted, proportional to the distance between the centre of oscillation of the coupling, situated at B, and the perpendicular dropped from the centre of gravity of the semi-trailer, situated at A, which means that the force required for the re-straightening of a semi-trailer only inclined at a slight angle is much smaller than that required when it is inclined at a considerable angle, and vice versa.

I claim:
1. In a semi-trailer coupling for a tractor-trailer vehicle comprising:
   (a) a cradle for mounting on a tractor vehicle;
   (b) a seating for coupling to the trailer and engageable with said cradle and slidable angularly with respect to said cradle about a common axis;
   (c) interengaging means on said cradle and seating controlling longitudinal movement thereof;
   (d) first spaced pressing elements on said cradle; and
   (e) second spaced pressing elements on said seating, the improvement comprising:
   buffer blocks of resiliently compressible material having a reduced cross sectional shape along the line of thrust, disposed between said pressing elements to resist relative angular movement of said cradle and seating, such that under increasing compression successively greater cross sections come into action.

2. A semi-trailer coupling, as claimed in claim 1, wherein said buffers comprise a plurality of elements of resiliently compressible material, said elements being successively of reduced cross-section along the line of thrust, said elements having interposed between them a plurality of rigid flanged members adapted to restrain lateral expansion of the elements.

References Cited by the Examiner

UNITED STATES PATENTS

| 2,833,561 | 5/1958 | Vaugoyeau | 280—438 |
| 3,122,382 | 2/1964 | Carrier | 280—438 |

FOREIGN PATENTS

| 825,821 | 12/1959 | Great Britain. |
| 830,303 | 3/1960 | Great Britain. |

LEO FRIAGLIA, *Primary Examiner.*